T. 858,014

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 723

624,687

POLYCARBONATE ESTER LUBRICANTS

Winston J. Jackson, Jr., and John W. Thompson, both of P.O. Box 511, Kingsport, Tenn. 37662

Filed Mar. 21, 1967. Published Jan. 21, 1969

Class 260—463

No Drawing. 10 Pages Specification

A new class of carbonate esters has been found which are useful as high-temperature lubricants and functional fluids. The carbonate esters may be prepared from the chloroformate of a saturated primary 2,2-dialkyl alcohol having about 5 to 14 carbon atoms and a saturated primary polyhydric alcohol having no beta-hydrogen atoms and containing about 5 to 10 carbon atoms. Some examples of the carbonate esters include 1,1,1-trimethylolpropane tris (2,2,4-trimethylpentyl carbonate), 2,2-dimethyl-1,3-propanediol bis(2,2,4-trimethylpentyl carbonate), 2-butyl-2-ethyl-1,3-propanediol bis(2,2-dimethyloctyl carbonate), and pentaerythritol tetra(2,2-dimethylpentyl carbonate). The stability of these carbonate esters may be further enhanced by incorporating therein small amounts of an aromatic amine antioxidant.